United States Patent
Kojo et al.

(10) Patent No.: US 10,648,855 B2
(45) Date of Patent: May 12, 2020

(54) METHOD OF DETECTING SPOT SHAPE OF PULSED LASER BEAM

(71) Applicant: DISCO CORPORATION, Tokyo (JP)

(72) Inventors: Tasuku Kojo, Tokyo (JP); Koichi Shigematsu, Tokyo (JP); Chang Yuan-Yang, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 165 days.

(21) Appl. No.: 15/723,771

(22) Filed: Oct. 3, 2017

(65) Prior Publication Data

US 2018/0094972 A1    Apr. 5, 2018

(30) Foreign Application Priority Data

Oct. 4, 2016    (JP) ................. 2016-196326

(51) Int. Cl.
| | |
|---|---|
| *B23K 26/03* | (2006.01) |
| *G01J 1/42* | (2006.01) |
| *B23K 26/08* | (2014.01) |
| *B23K 31/12* | (2006.01) |
| *B23K 26/70* | (2014.01) |
| *B23K 101/40* | (2006.01) |

(52) U.S. Cl.
CPC .......... *G01J 1/4257* (2013.01); *B23K 26/032* (2013.01); *B23K 26/0823* (2013.01); *B23K 26/0853* (2013.01); *B23K 26/0876* (2013.01); *B23K 26/705* (2015.10); *B23K 31/125* (2013.01); *B23K 2101/40* (2018.08)

(58) Field of Classification Search
CPC ........................... B23K 26/032; B23K 26/705
See application file for complete search history.

(56) References Cited

U.S. PATENT DOCUMENTS

| | | | |
|---|---|---|---|
| 2005/0215986 A1* | 9/2005 | Chernyak | ............... A61F 9/008 606/5 |
| 2015/0364374 A1* | 12/2015 | Hamaguchi | ............. H01L 21/78 257/52 |

FOREIGN PATENT DOCUMENTS

JP    2006-294674    10/2006

\* cited by examiner

*Primary Examiner* — Thanh Luu
(74) *Attorney, Agent, or Firm* — Greer Burns & Crain, Ltd.

(57) ABSTRACT

A method of detecting a spot shape of a pulsed laser beam, includes applying a pulsed laser beam having a wavelength absorbable by an inspection wafer held on a chuck table continuously to the inspection wafer with a focused point on an upper surface of the inspection wafer thereby to form a plurality of laser spots on the upper surface of the inspection wafer. An image of the laser spots is captured, and profiles of shapes of the laser spots are extracted from the captured image of the laser spots. A degree of similarity between the captured image and the profile of an ideal laser spot shape is calculated and stored in a memory. The shapes of the laser spots are found to be improper if the calculated degree of similarity is lower than a threshold value.

2 Claims, 4 Drawing Sheets

FIG.5A  FIG.5B  FIG.5C
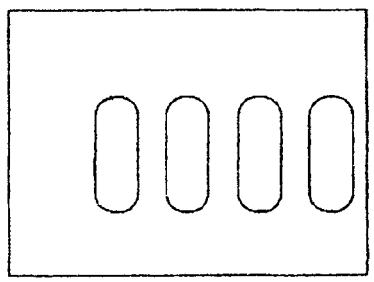 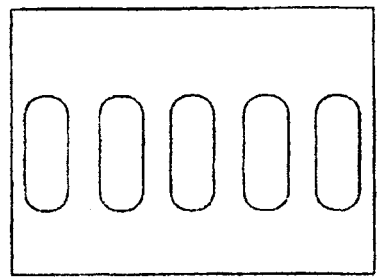 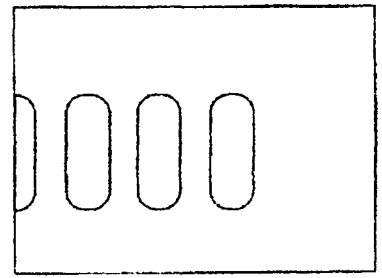
FIG.6A  FIG.6B  FIG.6C
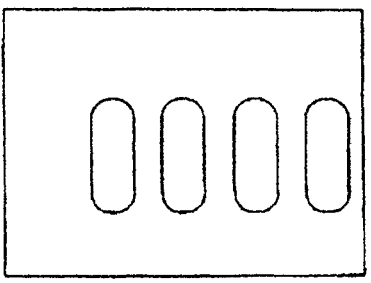 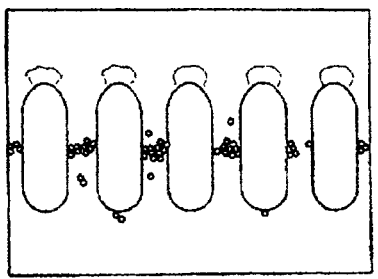 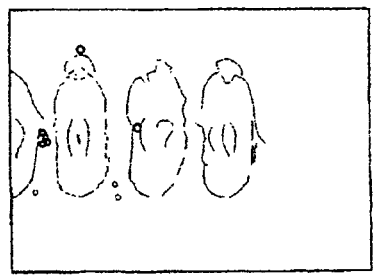

METHOD OF DETECTING SPOT SHAPE OF PULSED LASER BEAM

BACKGROUND OF THE INVENTION

Field of the Invention

The present invention relates to a method of detecting a spot shape of a pulsed laser beam that is formed on a wafer by a pulsed laser beam applied to the wafer.

Description of the Related Art

In the process of fabricating semiconductor devices, a plurality of areas are demarcated on the surface of a semiconductor wafer that is substantially of a disk shape by a grid of projected dicing lines formed on the surface of the semiconductor wafer, and devices such as integrated circuits (ICs), large scale integration (LSI) circuits, etc. are formed in the demarcated areas. For dividing the semiconductor wafer along the projected dicing lines, there has been proposed a method of irradiating the wafer with a pulsed laser beam whose wavelength is absorbable by the wafer, thereby forming laser-processed grooves as fracture initiators in the wafer along the projected dicing lines, and applying external forces to the wafer along the projected dicing lines to break the wafer into device chips (see, for example, Japanese Patent Laid-Open No. 2006-294674).

According to Japanese Patent Laid-Open No. 2006-294674, the pulsed laser beam is emitted by laser beam applying means including a laser oscillator for oscillating a laser beam, a beam condenser for focusing the laser beam oscillated by the laser oscillator and applying the focused laser beam to the wafer, and an optical system disposed between the oscillator and the beam condenser for transmitting the laser beam oscillated by the laser oscillator to the lens condenser.

SUMMARY OF THE INVENTION

In the laser beam applying means, impurities such as debris, etc. tend to settle on lenses and other optical components through which the laser beam travels in the beam condenser and the optical system. When the laser beam passes through the lenses and other optical components, they are expanded due to the deposited impurities and liable to fail to focus the laser beam into an intended spot shape such as a circular shape or the like. As a result, the focused spot of the laser beam may be so distorted in shape that it may not process the wafer as desired. One way of confirming the shape of the focused spot of the laser beam would be for the operator to visually check the laser beam spot with a microscope or the like. However, the operator's visual inspection is problematic in that the accuracy is unstable as it depends on how skillful the operator is and the time required to confirm the shape of the laser beam spot is relatively long.

It is an object of the present invention to provide a method of detecting a spot shape of a pulsed laser beam with ease.

In accordance with an aspect of the present invention, there is provided a method of detecting a spot shape of a pulsed laser beam including an inspection wafer placing step, a laser spot forming step, an imaging step, a calculating step, a properness diagnosing step, and a reporting step. The inspection wafer placing step places an inspection wafer on a chuck table. After performing the inspection wafer placing step, the laser spot forming step applies a pulsed laser beam having a wavelength absorbable by the inspection wafer continuously to the inspection wafer with a focused point on an upper surface of the inspection wafer thereby to form a plurality of laser spots on the upper surface of the inspection wafer with clearances between adjacent ones of the laser spots. After performing the laser spot forming step, the imaging step captures an image of the laser spots with imaging means. The calculating step extracts profiles of shapes of the laser spots from the image of the laser spots captured in the imaging step, and calculates a degree of similarity of the extracted profiles to the profile of an ideal laser spot shape stored in storage means. The properness diagnosing step decides the shapes of the laser spots are improper if the degree of similarity calculated in the calculating step is lower than a threshold value. The reporting step reports the shapes of the laser spots are improper if it is decided in the properness diagnosing step that the shapes of the laser spots are improper.

According to the above method, the laser spots are imaged by the imaging means, and can be decided as not proper on the basis of a captured image by control means. Therefore, any process performed by the operator to confirm the shapes of the laser spots is not necessary. The accuracy with which to detect the shapes of the laser spots does not vary from operator to operator, and hence the laser spots can easily be assessed stably. In addition, the period of time required to determine whether the shapes of the laser spots are proper or not is shorter than if the operator visually checks the laser spots for their shapes, resulting in an efficient detecting process.

Preferably, laser spots are formed on an inspection wafer after the elapsing of a predetermined period during which if impurities have settled on an optical system or a beam condenser through which the pulsed laser beam travels, a component of the optical system or the beam condenser is heated and expanded due to the impurities when the pulsed laser beam travels through the optical system and the beam condenser.

According to the present invention, inasmuch it is possible to decide that the laser spots are not proper on the basis of the image captured by the imaging means, the shapes of the laser spots can easily be assessed.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIGS. 5A through 5C are enlarged fragmentary plan views depicting by way of example captured images of proper laser spots; and FIGS. 6A through 6C are enlarged fragmentary plan views depicting by way of example captured images of improper laser spots.

DETAILED DESCRIPTION OF THE PREFERRED EMBODIMENT

Figure 1:
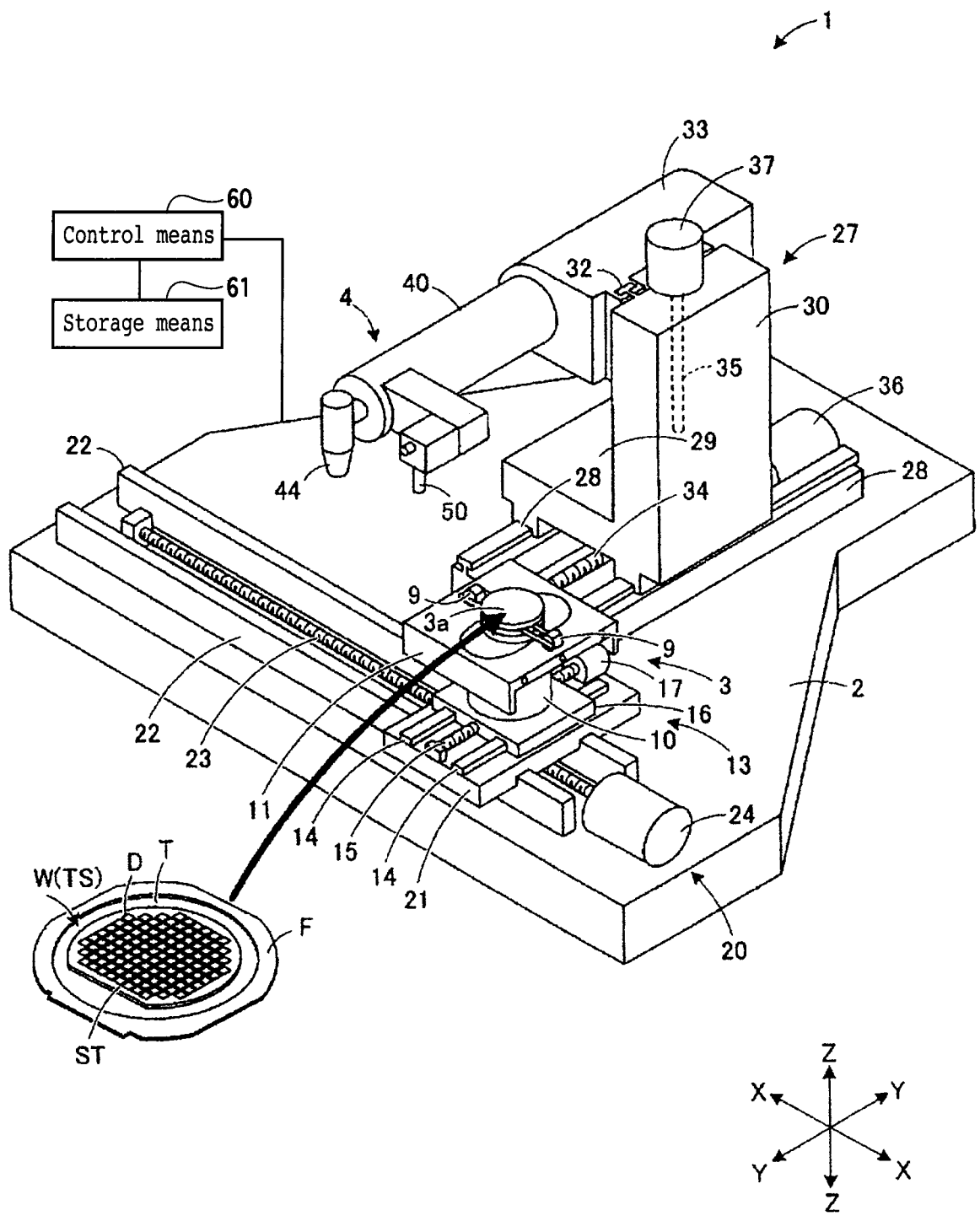
FIG. 1 is a perspective view depicting an example of a laser processing apparatus according to the present invention is carried out.

A method of detecting a spot shape of a pulsed laser beam according to an embodiment of the present invention will be described in detail below with reference to the accompanying drawings. FIG. 1 depicts in perspective a laser processing apparatus by way of example. The method of detecting a spot shape of a pulsed laser beam according to the present embodiment is carried out on the laser processing apparatus depicted in FIG. 1. A laser processing apparatus that can be used to carry out the method according to the present embodiment is not limited to the laser processing apparatus depicted in FIG. 1, but may be any laser processing apparatus as long as it can process a wafer in the same way as the present embodiment.

As depicted in FIG. 1, a laser processing apparatus 1 is arranged to process a wafer (workpiece) W in the shape of a disk held on a chuck table (holding means) 3 on a base 2, with laser beam applying means 4 disposed above the chuck table 3. The wafer W has a plurality of areas demarcated on its face side by a grid of streets ST formed thereon, and devices D such as ICs, LSI circuits, etc. formed in the demarcated areas. A dicing tape T that includes a sheet of synthetic resin is bonded to a reverse side of the wafer W. The wafer W is mounted on an annular frame F by the dicing tape T. The wafer W may be of any of various types insofar as a laser spot can be formed thereon by a pulsed laser beam, as described later. For example, the wafer W may be a semiconductor wafer with devices such as ICs, LSI circuits, etc. formed on a semiconductor substrate made of silicon, gallium arsenide, or the like, or an optical device wafer with optical devices such as light-emitting diodes (LEDs), etc. formed on an inorganic substrate made of sapphire, silicon carbide, or the like.

The chuck table 3 has a holding surface 3a at its upper surface which is made of porous ceramics for holding the reverse side of the wafer W under suction thereon. The holding surface 3a is connected to a suction source, not depicted, through a channel defined in the chuck table 3. The chuck table 3 is in the shape of a disk rotatable about its own axis by rotating means, not depicted. A pair of diametrically opposite clamps 9 is supported on a circumferential surface of the chuck table 3 by support arms. When the clamps 9 are actuated by an actuator, not depicted, the clamps 9 hold down the frame F around the wafer W on diametrically opposite sides thereof along X-axis directions, thereby securely holding the wafer W on the chuck table 3.

A cover 11 supported on a hollow cylindrical member 10 is disposed underneath the chuck table 3. The hollow cylindrical member 10 is mounted on indexing-feed means 13. The indexing-feed means 13 has a pair of guide rails 14 extending parallel to each other in Y-axis directions and spaced apart from each other in the X-axis directions, a ball screw 15 disposed between the guide rails 14 and extending in the Y-axis directions, and a Y-axis table 16 slidably mounted on the guide rails 14. The ball screw 15 is threaded through a nut, not depicted, fixed to a lower surface of the Y-axis table 16. The hollow cylindrical member 10 is disposed on an upper surface of the Y-axis table 16. When a motor 17 coupled to an end of the ball screw 15 is energized, the ball screw 15 rotates about its own axis, moving the Y-axis table 16 in indexing-feed directions, i.e., the Y-axis directions, along the guide rails 14.

The indexing-feed means 13 is mounted on an X-axis table 21 of processing-feed means 20. Specifically, the guide rails 14 and the ball screw 15 are mounted on the X-axis table 21. The processing-feed means 20 also includes a pair of guide rails 22 extending parallel to each other in the X-axis directions and spaced apart from each other in the Y-axis directions, and a ball screw 23 disposed between the guide rails 22 and extending in the X-axis directions. The guide rails 22 and the ball screw 23 are mounted on the base 2. The X-axis table 21 is slidably mounted on the guide rails 22. The ball screw 23 is threaded through a nut, not depicted, fixed to a lower surface of the X-axis table 21. When a drive motor 24 coupled to an end of the ball screw 23 is energized, the ball screw 23 rotates about its own axis, moving the X-axis table 21 in processing-feed directions, i.e., the X-axis directions, along the guide rails 22.

The laser beam applying means 4 is supported above the chuck table 3 by a support mechanism 27 so as to be movable in the Y-axis directions and Z-axis directions. The support mechanism 27 has a pair of guide rails 28 extending parallel to each other in the Y-axis directions and spaced apart from each other in the X-axis directions, a ball screw 34 disposed between the guide rails 28 and extending in the Y-axis directions, and a Y-axis table 29 slidably mounted on the guide rails 28. The ball screw 34 is threaded through a nut, not depicted, mounted on a lower surface of the Y-axis table 29. The guide rails 28 and the ball screw 34 are mounted on the base 2. The Y-axis table 29 is formed in a rectangular shape in the top plan view, and a side wall 30 is erected in an end thereof in the X-axis directions.

The support mechanism 27 also has a pair of guide rails 32 (one depicted) extending parallel to each other in the Z-axis directions and spaced apart from each other in the Y-axis directions, a ball screw 35 disposed between the guide rails 32 and extending in the Z-axis directions, and a Z-axis table 33 slidably mounted on the guide rails 32. The ball screw 35 is threaded through a nut, not depicted, mounted on a side surface of The Z-axis table 33. The guide rails 32 and the ball screw 35 are mounted on the side wall 30. When drive motors 36 and 37 coupled to respective ends of the ball screws 34 and 35 are energized, the ball screws 34 and 35 rotate about their own axes, moving the laser beam applying means 4 in the Y-axis directions and the Z-axis directions along the respective pairs of guide rails 28 and 32.

Figure 2:
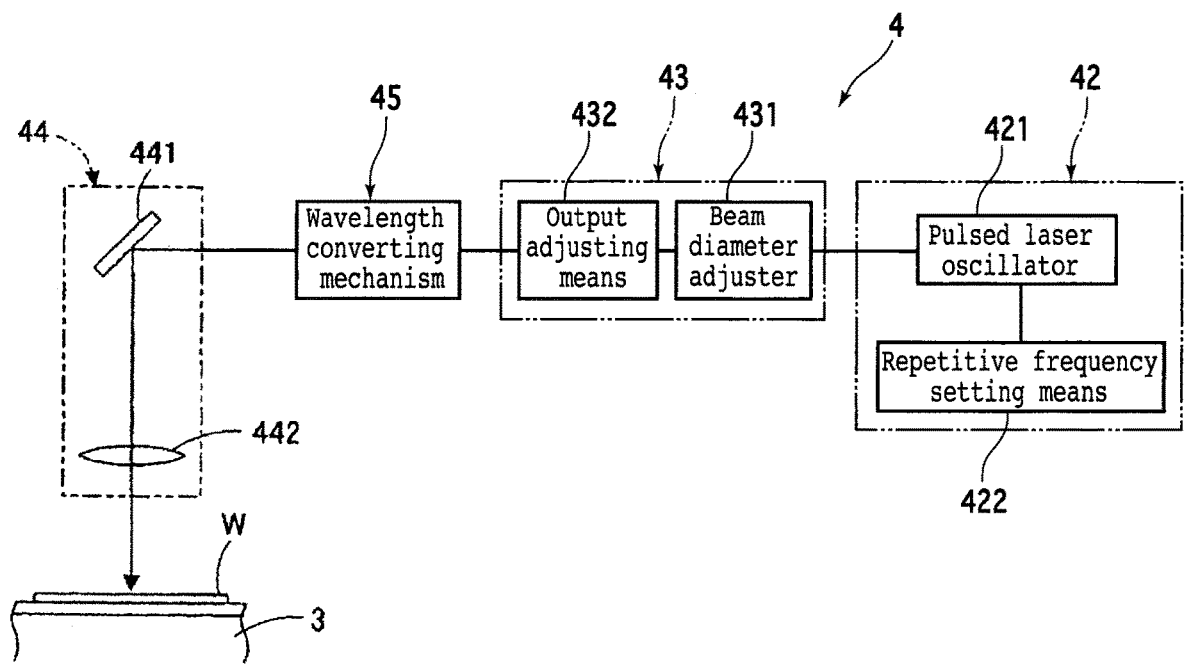
FIG. 2 is a block diagram of laser beam applying means incorporated in the laser processing apparatus.

The laser beam applying means 4 includes a hollow cylindrical casing 40 supported on the Z-axis table 33 in a cantilevered fashion and a beam condenser 44 mounted on the distal end of the casing 40. The laser beam applying means 4 will be described in greater detail below with reference to FIG. 2. FIG. 2 depicts in block form the laser beam applying means which is incorporated in the laser processing apparatus. As depicted in FIG. 2, the laser beam applying means 4 includes laser beam oscillating means 42 disposed in the casing 40 depicted in FIG. 1, an optical system 43 for transmitting a pulsed laser beam oscillated by the laser beam oscillating means 42, the beam condenser 44 for converging the pulsed laser beam transmitted by the optical system 43 and applying the converged pulsed laser beam to the wafer W held on the chuck table 3, and a wavelength converting mechanism 45 disposed between the optical system 43 and the beam condenser 44, for converting the wavelength of the pulsed laser beam oscillated by the laser beam oscillating means 42 into a short wavelength suitable for the processing of the wafer W.

The laser beam oscillating means 42 includes a pulsed laser oscillator 421 for oscillating a pulsed laser beam having a wavelength of 1064 nm, for example, and repetitive frequency setting means 422 for setting a repetitive frequency for the pulsed laser beam oscillated by the pulsed laser oscillator 421. The optical system 43 is disposed between the laser beam oscillating means 42 and the wavelength converting mechanism 45. The optical system 43 includes a beam diameter adjuster 431 for adjusting the diameter of the pulsed laser beam oscillated by the laser beam oscillating means 42, and output adjusting means 432 for adjusting the output level of the pulsed laser beam oscillated by the laser beam oscillating means 42 to a predetermined output level. The pulsed laser oscillator 421 and the repetitive frequency setting means 422 of the laser beam oscillating means 42 and the beam diameter adjuster 431 and the output adjusting means 432 of the optical system 43 are controlled by control means 60 to be described later.

The beam condenser 44 includes a direction changing mirror 441 for changing the direction of a pulsed laser beam that has been oscillated by the laser beam oscillating means 42, transmitted by the optical system 43, and converted in wavelength by the wavelength converting mechanism 45 to be described later, to a direction toward the chuck table 3, and a condensing lens 442 for converging the pulsed laser beam whose direction has been changed by the direction changing mirror 441 and applying the converged pulse laser beam to the wafer W. As described above, the wavelength converting mechanism 45 is disposed between the optical system 43 and the beam condenser 44. The wavelength converting mechanism 45 converts a pulsed laser beam having a wavelength of 1064 nm, which has traveled through the optical system 43, into a pulsed laser beam having a wavelength of 532 nm or 266 nm, for example.

Referring back to FIG. 1, imaging means 50 is mounted on a distal end portion of the casing 40. The imaging means 50 is capable of capturing an image of a surface area of the wafer W that has been projected at an enlarged scale with a predetermined magnification by a microscope. The imaging means 50 includes an imaging device, not depicted, such as a charge-coupled device (CCD) or the like, which includes a plurality of pixels and generates electric signals commensurate with amounts of light detected by the respective pixels. The imaging means 50 captures an image of the face side of the wafer W, and the beam condenser 44 of the laser beam applying means 4 and one at a time of the streets ST on the wafer W are aligned with each other on the basis of the image captured by the imaging means 50.

The control means 60 of the laser processing apparatus 1 controls various components of the laser processing apparatus. The control means 60 includes a processor for carrying out various processing sequences of the laser processing apparatus 1. The control means 60 is supplied with a signal detected by the imaging means 50 and detected signals from various detectors, not depicted. The control means 60 outputs control signals to the drive motors 17, 24, 36, and 37, the laser beam oscillating means 42, and other components of the laser processing apparatus 1.

The laser processing apparatus 1 also includes storage means 61 for storing various parameters, programs, etc. The storage means 61 includes a memory that is made up of one or more storage media such as a read only memory (ROM), a random access memory (RAM), etc., depending on how the storage means 61 is used. The storage means 61 stores therein data about the profile of the shape of an ideal laser spot LS (see FIG. 3) to be described later, a threshold value of similarity to be described later with respect to the profile, etc.

A process of processing the wafer will be described below. In the process of processing the wafer W on the laser processing apparatus according to the present embodiment, a plurality laser spots LS (see FIG. 3) are formed at predetermined intervals on the wafer W along the streets ST. First, a wafer placing step is carried out. In the wafer placing step, the wafer W supported on the annular frame F by the dicing tape T is placed on the chuck table 3 depicted in FIG. 1 by transporting means, not depicted. Then, suction means, not depicted, is actuated to hold the wafer W under suction on the chuck table 3 with the dicing tape T interposed therebetween. The frame F is secured in place by the clamps 9.

The wafer placing step is followed by a laser spot forming step. In the laser spot forming step, first, the chuck table 3 is initially positioned immediately below the imaging means 50 by the processing-feed means 20, and then an alignment process is performed to detect an area to be laser-processed on the wafer W by the imaging means 50 and the control means 60. In the alignment process, for aligning the beam condenser 44 of the laser beam applying means 4 and the street ST on the wafer W, the control means 60 performs an image processing sequence such as pattern matching or the like on an image captured by the imaging means 50, detecting a pair of target patterns.

Thereafter, the control means 60 controls the chuck table 3 to move and rotate according to the results of the image processing sequence for thereby positioning the wafer W such that either one of the streets ST extend parallel to the X-axis directions. Then, the beam condenser 44 of the laser beam applying means 4 is positioned in alignment with the street ST extending parallel to the X-axis directions, hereinafter referred to as "target street ST," over the wafer W held on the chuck table 3. The focused point of a pulsed laser beam emitted from the beam condenser 44 is positioned on the upper surface of the wafer W on the chuck table 3. While the pulsed laser beam, whose wavelength is absorbable by the wafer W, is applied from the beam condenser 44 to the wafer W, the chuck table 3 and the beam condenser 44 are relatively moved in one of the X-axis directions as a processing-feed direction by the processing-feed means 20.

Figure 3:
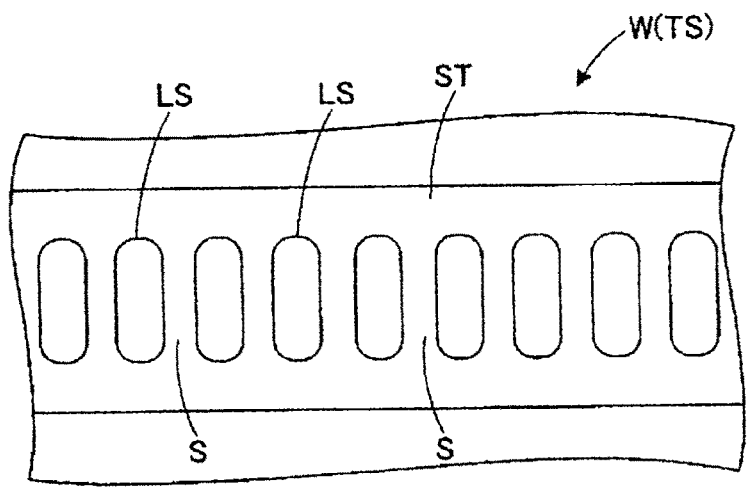
FIG. 3 is an enlarged fragmentary plan view of a wafer on which a laser spot forming step of the method is performed.

As depicted in FIG. 3, a plurality of laser spots LS are now formed at respective pulse pitches based on the wavelength of the pulsed laser beam along the target street ST on the upper surface of the wafer W. Stated otherwise, the pulsed laser beam is continuously applied to the wafer W to form a succession of laser spots LS on its upper surface that are spaced by clearances S between adjacent ones thereof. FIG. 3 depicts in enlarged fragmentary plan the wafer on which the laser spot forming step has been carried out. In FIG. 3, each of the laser spots LS is of a rounded rectangular or oblong shape. However, each of the laser spots LS may be of a circular shape, an elliptical shape, a square shape, or the like.

After the laser spots LS have been formed along the target street ST on the wafer W, the laser beam applying means 4 stops applying the pulsed laser beam, and then the chuck table 3 and the beam condenser 44 are relatively moved, i.e., indexing-fed, in one of the Y-axis directions by a distance corresponding to the spacing between adjacent streets ST. The beam condenser 44 is now aligned with a street ST adjacent to the target street ST along which the laser spots LS have been formed. Then, a plurality of laser spots ST are formed along the street ST adjacent to the target street ST. The above operation is repeated until laser spots LS are formed along all the streets ST that extend along a first direction, i.e., the X-axis directions. Thereafter, the chuck table 3 is rotated 90 degrees about its own axis, and the same operation as described above is repeated until laser spots LS are formed along all the streets ST that extend along a second direction perpendicular to the first direction.

A method of detecting the shape of the laser spots LS thus formed will be described below. The detecting method uses an inspection wafer instead of the wafer W described above. The inspection wafer may be identical to the wafer W or a wafer made of a material or at a cost different from the wafer W, insofar as laser spots LS can be formed thereon in the same manner as described above.

In the method of detecting the shape of the laser spots LS according to the present embodiment, the wafer W is replaced with the inspection wafer, and the same wafer placing step as described above is carried out, after which a laser spot forming step is performed. In FIGS. 1 and 3, the inspection wafer is denoted by TS in parentheses alongside the reference character W. The method of detecting the shape of the laser spots LS includes a wafer placing step, a laser spot forming step, an assessing step, and a reporting step that are carried out in the order named. The wafer placing step will not be described below as it is the same as the wafer placing step described above.

In the laser spot forming step, laser spots LS are formed on the inspection wafer TS in the same manner as the laser spot forming step in the above method of processing the wafer W. However, for forming laser spots LS to be assessed by the assessing step to be described later, the laser spot forming step is required to satisfy the following conditions: If it is assumed that impurities have settled on the optical system 43 or the beam condenser 44, then after a plurality of laser spots LS are formed on the inspection wafer TS, laser spots LS are formed immediately before the elapsing of a predetermined expansion period during which optical components such as the condensing lens 442 through which the pulsed laser beam passes are heated and expanded by the deposited impurities when the pulsed laser beam travels through the optical system 43 and the beam condenser 44. If the expansion period can be empirically specified as five minutes, then laser spots LS to be assessed by the assessing step are formed until immediately before five minutes elapse after the plurality of laser spots LS have been formed on the inspection wafer TS. The assessing step is carried out after the laser spot forming step has been carried out.

Figure 4:
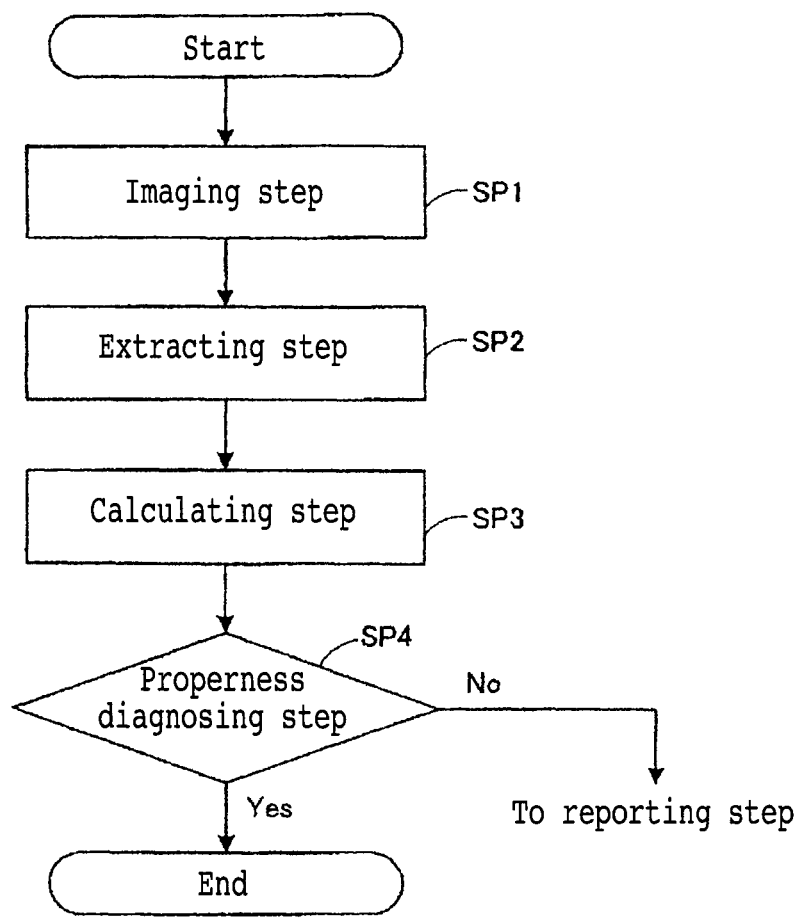
FIG. 4 is a flowchart of a processing sequence of an assessing step of the method.

FIG. 4 is a flowchart of a processing sequence of the assessing step. As depicted in FIG. 4, the assessing step includes imaging step SP1, extracting step SP2, calculating step SP3, and properness diagnosing step SP4.

In imaging step SP1, the laser spots LS are positioned directly below the imaging means 50, and imaged by the imaging means 50 at a plurality of locations along the X-axis direction that serves as the processing-feed direction. The locations may correspond to the time when the pulsed laser beam starts being applied, an intermediate time in a period from the time when the pulsed laser beam starts being applied to the time when the pulsed laser beam ends being applied, and the time immediately before the elapsing of the expansion period when the pulsed laser beam ends being applied. Image data of the imaged laser spots LS are input from the imaging means 50 to the control means 60.

Imaging step SP1 is followed by extracting step SP2. In extracting step SP2, the control means 60 carries out an appropriate process of extracting the profiles of the laser spots LS from the image data of the imaged laser spots LS. For example, the control means 60 performs an image processing sequence for linearly extracting the profiles of the laser spots LS from the image data of the imaged laser spots LS according to a predetermined algorithm.

After extracting step SP2, calculating step SP3 is carried out. Prior to calculating step SP3, reference data of an ideal profile for the shape of the laser spots LS are stored in the storage means 61 on the basis of conditions in which the pulsed laser beam is applied. In calculating step SP3, the control means 60 compares the image data of the laser spots LS extracted in extracting step SP2 and the reference data stored in the storage means 61 with each other, and calculates a degree of similarity of the image data to the reference data by way of pattern matching or the like. The degree of similarly represents a deviation of the image data from the reference data. If the deviation is larger, then the degree of similarity is smaller, i.e., if the deviation is smaller, then the degree of similarity is larger.

Calculating step SP3 is followed by properness diagnosing step SP4. Prior to properness diagnosing step SP4, a threshold value of similarity is stored in the storage means 61. If the shapes of the laser spots LS are proper, then the degree of similarity remains essentially the same at the time when the pulsed laser beam starts being applied and at the time immediately before the elapsing of the expansion period. Therefore, the degree of similarly at the time when the pulsed laser beam starts being applied is preset as a reference threshold value. Alternatively, when the wafer W starts being broken into device chips at the laser spots LS that serve as fracture initiators, the laser spots LS may or may not function properly as fracture initiators depending on their shapes. Consequently, a threshold value may be established as a value slightly higher than a value between the degree of similarity at which the laser spots LS function properly as fracture initiators and the degree of similarity at which the laser spots LS do not function properly as fracture initiators. In properness diagnosing step SP4, the control means 60 compares the degree of similarity calculated in calculating step SP3 and the threshold value stored in the storage means 61 with each other. If the degree of similarity is higher than the threshold value, then the control means 60 decides that the shapes of the laser spots LS are proper (step SP4: Yes), and the method of detecting the shape of the laser spots LS is ended. Then, the wafer W for use as a product wafer starts being processed on the laser processing apparatus 1. If the degree of similarity is lower than the threshold value, then the control means 60 decides that the shapes of the laser spots LS are not proper (step SP4: No), and the reporting step is carried out.

In the reporting step, when the control means 60 decides that the shapes of the laser spots LS are not proper, as described above, the control means 60 controls a display, a lamp, an alarm, or the like, not depicted, to report to the operator that the shapes of the laser spots LS are not proper. After thus reported, the operator cleans and/or services the optical system 43 and the beam condenser 44 of the laser beam applying means 4, or replaces the optical system 43 and the beam condenser 44 with brand-new counterparts.

In the detecting method according to the present embodiment, therefore, the control means 60 can determine whether or not the shapes of the laser spots LS are proper on the basis of the captured images of the laser spots LS. The operator is not required to visually check the laser spots LS for their shapes, and the accuracy of detection is prevented from being unstable depending on how skillful the operator is, so that the shapes of the laser spots LS can be detected accurately and stably. In addition, the period of time required to determine whether or not the shapes of the laser spots LS are proper is shorter than if the operator visually checks the laser spots LS for their shapes, resulting in an efficient detecting process.

Further, the laser spots LS can be detected using the imaging means 50 that is provided for aligning the wafer W.

The laser processing apparatus 1 is relatively simple as there is no need for extra sensors and imaging devices for detecting the laser spots LS.

Further, the expansion period referred to above is allowed to elapse before the laser spots LS to be assessed by the assessing step are formed in the laser spot forming step of the detecting method according to the present embodiment. Consequently, in the event that impurities such as debris, etc. have settled on the optical components through which the laser beam travels, the laser spots LS are prevented from being assessed as proper before those optical components are expanded. As a result, after the laser spots LS for assessment have been assessed as proper, laser spots LS are prevented from being formed improperly on the wafer W due to the optical components heated and expanded when the wafer W is processed as a product wafer.

FIGS. 5A through 5C and 6A through 6C depict examples of captured images of laser spots. The captured images as illustrated as line drawings in these figures. Specifically, FIGS. 5A through 5C depict by way of example captured images of laser spots assessed as proper, and FIGS. 6A through 6C depict by way of example captured images of laser spots assessed as improper. FIGS. 5A and 6A depict captured images of laser spots at the time when the pulsed laser beam starts being applied. FIGS. 5B and 6B depict captured images of laser spots at an intermediate time during the expansion period. FIGS. 5C and 6C depict captured images of laser spots at the time immediately before the elapsing of the expansion period. FIGS. 5A through 5C and 6A through 6C are arranged in chronological order.

In FIGS. 5A through 5C, the profiles of the shapes of the laser spots that are of a vertically long, rounded rectangular shape remain substantially the same from the time when the pulsed laser beam starts being applied to the time when the pulsed laser beam ends being applied. The laser spots are thus formed properly. When the laser spots are detected by the detecting method according to the embodiment described above, the shapes of the laser stops are assessed as proper in the assessing step.

In FIGS. 6A through 6C, the profiles of the shapes of the laser spots are proper when the pulsed laser beam starts being applied. However, as the application of the pulsed laser beam progresses, the profiles are deformed or distorted, so that the laser spots are not formed properly. One of the reasons for the improperly formed laser spots is that impurities such as debris, etc. have settled on the lenses and other optical components of the beam condenser 44 and the optical system 43 of the laser beam applying means 4, and when the laser beam passes through the lenses and other optical components, they are heated and expanded due to the deposited impurities and liable to fail to focus the laser beam into an intended spot shape that was achieved when the pulsed laser beam started being applied. When these laser spots are detected by the detecting method according to the present embodiment, the shapes of the laser spots depicted in FIG. 6C are assessed as improper in the assessing step. According to the present embodiment, therefore, when the shapes of the laser spots are distorted, it is possible to easily grasp whether or not proper laser spots can be formed on the basis of the captured images of the laser spots.

For carrying out the properness diagnosing step on the laser spots formed as depicted in FIGS. 5A through 5C and 6A through 6C, it is assumed that the degree of similarity is 80 and the threshold value is represented by a range of 70 to 90 for the laser spots depicted in FIGS. 5A and 6A (when the pulsed laser beam starts being applied). The degree of similarity is 79 for the laser spots depicted in FIG. 5B and 78 for the laser spots depicted in FIG. 5C, and these degrees of similarity are within the threshold value range of 70 to 90. The shapes of the laser spots depicted in FIGS. 5B and 5C are therefore assessed as properly. However, the degree of similarity is 70 for the laser spots depicted in FIG. 6B and 50 for the laser spots depicted in FIG. 6C, and they are lower than the threshold value range of 70 to 90. The shapes of the laser spots depicted in FIGS. 6B and 6C are assessed as improper, prompting the operator to clean and/or service or replace the lenses and other optical components.

The present invention is not limited to the embodiment illustrated above, but various changes, replacements, and modifications may be made in the embodiment without departing from the scope of present invention. Furthermore, the technical concept of the present invention may be reduced to practice by other methods realized by technological advances or derivations that may occur in the art. Therefore, the scope of appended claims should be construed as covering all possible embodiments that fall within the scope of the present invention.

In the above embodiment, the degree of similarity to the ideal laser spot shape is calculated by way of pattern matching in the assessing step. However, the degree of similarity between two laser spot shapes may be calculated by various methods, not by any limitative methods, as long as they allow a degree of correlation therebetween to be calculated.

In the laser spot forming step, the laser spots LS are formed by the pulsed laser beam which is resumed after the expansion period has elapsed. If the laser spot shapes are deformed by impurities deposited on the optical components without being affected by the expansion period, then the expansion period may not be included.

In the above embodiment, the imaging means 50 is shared by the detection of the laser spots LS and the alignment of the wafer W. However, the present invention does not exclude the use of respective imaging means for the detection of the laser spots LS and the alignment of the wafer W.

As described above, the present invention makes it possible to easily decide that the shapes of laser spots are not proper, and is useful in detecting the shapes of laser spots formed on a workpiece by applying a laser beam to the workpiece.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A method of detecting a spot shape of a pulsed laser beam, the method comprising:
   an inspection wafer placing step of placing an inspection wafer on a chuck table;
   after performing the inspection wafer placing step, a laser spot forming step of applying a pulsed laser beam having a wavelength absorbable by the inspection wafer continuously to the inspection wafer with a focused point on an upper surface of the inspection wafer thereby to form a plurality of laser spots on the upper surface of the inspection wafer with clearances between adjacent ones of the laser spots;
   after performing the laser spot forming step, an imaging step of capturing an image of the laser spots with imaging means;
   a calculating step of extracting profiles of shapes of the laser spots from the image of the laser spots captured in the imaging step, and calculating a degree of similarity of the extracted profiles to the profile of an ideal laser spot shape stored in storage means;

a properness diagnosing step of deciding that the shapes of the laser spots are improper if the degree of similarity calculated in the calculating step is lower than a threshold, wherein the laser spot forming step is carried out after the elapsing of a predetermined period during which if impurities have settled on an optical system or a beam condenser through which the pulsed laser beam travels, a component of the optical system or the beam condenser is heated and expanded due to the impurities when the pulsed laser beam travels through the optical system and the beam condenser.

2. A method of detecting a spot shape of a pulsed laser beam, the method comprising:

an inspection wafer placing step of placing an inspection wafer on a chuck table;

after performing the inspection wafer placing step, a laser spot forming step of applying a pulsed laser beam having a wavelength absorbable by the inspection wafer continuously to the inspection wafer with a focused point on an upper surface of the inspection wafer thereby to form a plurality of laser spots on the upper surface of the inspection wafer with clearances between adjacent ones of the laser spots;

after performing the laser spot forming step, an imaging step of capturing an image of the laser spots with imaging means;

a calculating step of extracting profiles of shapes of the laser spots from the image of the laser spots captured in the imaging step, and calculating a degree of similarity of the extracted profiles to the profile of an ideal laser spot shape stored in storage means;

a properness diagnosing step of deciding that the shapes of the laser spots are improper if the degree of similarity calculated in the calculating step is lower than a threshold value, wherein the threshold value is a value higher than a value between a degree of similarity at which the laser spots function properly as fracture initiators in a wafer to be processed and a degree of similarity at which the laser spots do not function properly as fracture initiators in the wafer to be processed; and a reporting step of reporting that the shapes of the laser spots are improper if it is decided in the properness diagnosing step that the shapes of the laser spots are improper.

* * * * *